Dec. 16, 1930.  G. A. THOM  1,785,332
HEADLIGHT
Filed Sept. 16, 1929   2 Sheets-Sheet 1
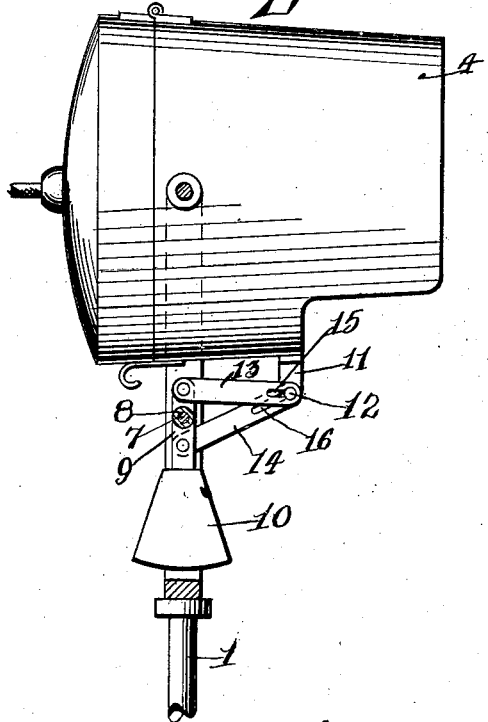
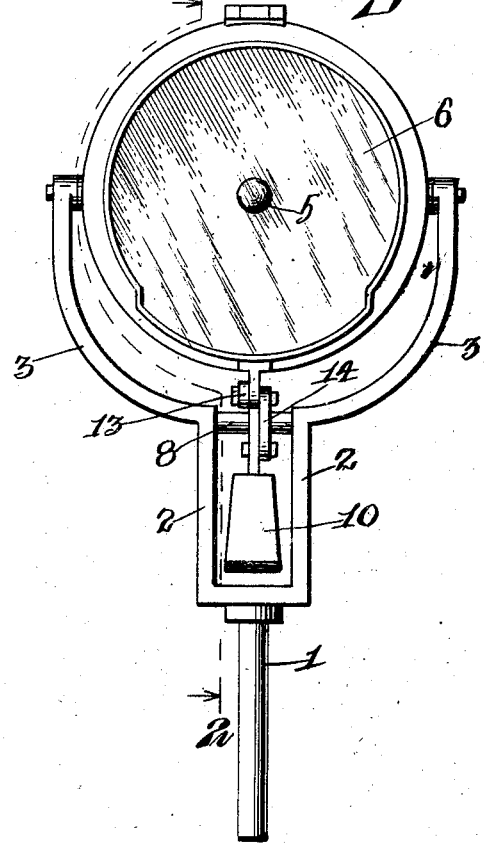
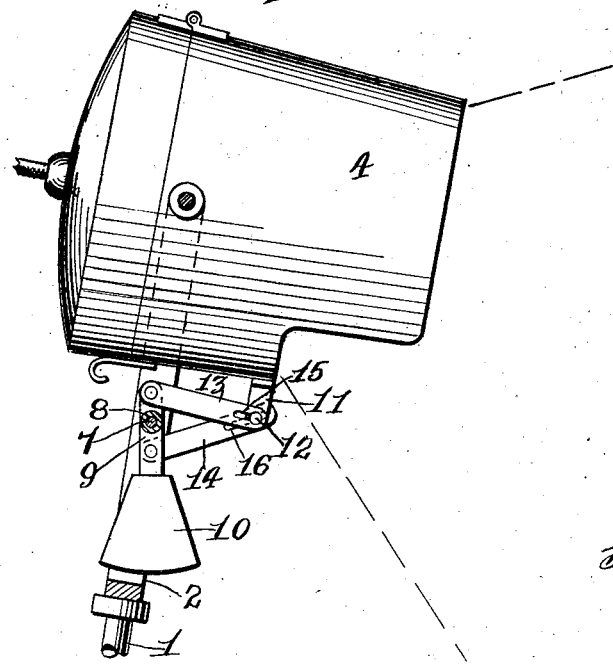
Inventor
G. A. Thom Dec. 16, 1930.  G. A. THOM  1,785,332
HEADLIGHT
Filed Sept. 16, 1929  2 Sheets-Sheet 2
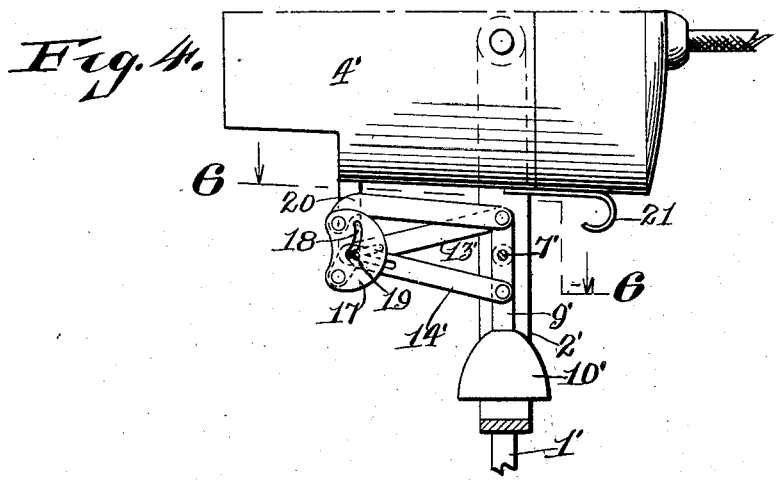
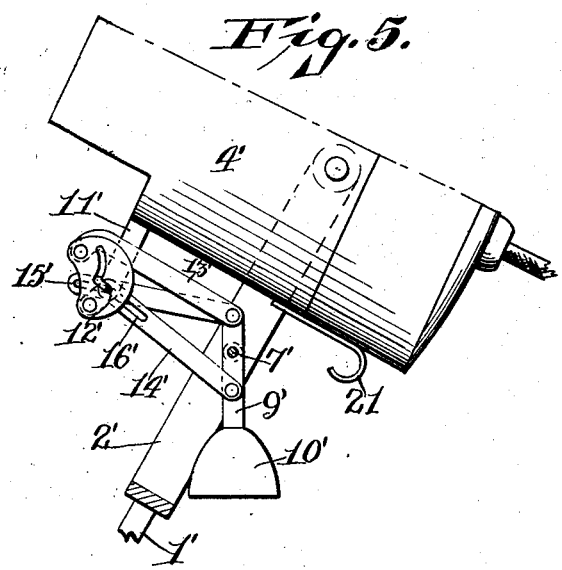
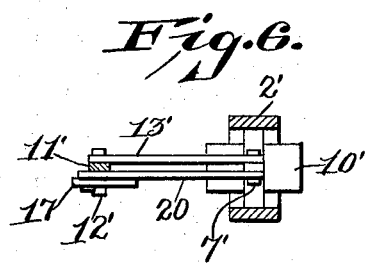
Inventor
G. A. Thom Patented Dec. 16, 1930

1,785,332

UNITED STATES PATENT OFFICE

GUSTAV A. THOM, OF WEST ALLIS, WISCONSIN

HEADLIGHT

Application filed September 16, 1929. Serial No. 392,844.

This invention relates to new and useful improvements in headlights and more particularly to vehicle headlights.

One of the objects of my invention is the provision of a vehicle headlight which is gravity controlled so that regardless of the position of the vehicle the rays from the headlight will be directed at the proper angle in advance of the vehicle and will always be maintained in a proper plane so as not to direct the glare into the eyes of the driver of an approaching vehicle.

Another object of my invention is the provision of a headlight which while particularly designed for use as a vehicle headlight, can be used for various other purposes and means is provided for preventing trembling or shaking of the headlight when the vehicle passes over rough and uneven roads, but causes the headlight to project an even and clear light in advance of the vehicle.

A further object of my invention is the provision of a vehicle headlight wherein the body is pivotally supported and connected by means of adjustable links, to a suspended weight whereby the weight will swing as a pendulum and through the link connection to the headlight will cause the light to readily adjust itself in accordance with the position of the vehicle, so as to reflect the rays of light directly in the forward path of the vehicle as required.

With the above and other objects in view, the invention consists in the novel features of construction, the combination and arrangement of parts hereinafter more fully set forth, pointed out in the claims and shown in the accompanying drawings wherein:

Figure 1 is a front elevation of the headlight constructed in accordance with my invention;

Figure 2 is a section on the line 2—2 of Figure 1;

Figure 3 is a view similar to Figure 2, showing the manner in which the headlight may be readily adjusted with respect to its support;

Figure 4 is a side elevation of a slightly modified form of the invention showing the same in its normal position;

Figure 5 is a similar view showing the device in an inclined position; and,

Figure 6 is a section on the line 6—6 of Figure 4.

Referring more particularly to the drawings, it will be noted that I have illustrated the usual standard 1 of the headlight which supports at its upper end a bracket comprising vertical parallel portions 2 and arcuate arms 3, the headlight 4 being pivotally supported between the upper ends of the arms 3. The headlight 4 may be of the conventional type or any special type with a light bulb 5 and transparent lens 6.

Between the upper ends of the parallel portions 2, I provide a transverse pin 7 upon which is rotatably mounted a collar 8. Attached to the collar 8 at its intermediate portion is an arm 9, normally positioned in a vertical plane and having suspended from its lower end a counter-balance weight 10 which is movable between the vertical portions 2 as illustrated.

Extending downwardly from the lower portion of the headlight 4 is a perforated lug 11, carrying a pin 12. The headlight 4 is connected to the arm 9 by means of the links 13 and 14.

One end of the link 13 is connected to the upper end of the arm 9 while the other end is formed with an elongated slot 15 adapted to receive the pin 12 to permit a certain amount of free movement of the link 13 relative the lug 11.

The link 14 has one end connected to the arm 9 below its pivot point and spaced from the connection of the link 13 with the arm 9. The other end of the link 14 is provided with an elongated slot 16 to receive the pin 12 whereby to permit free movement of the link 14 relative the pin. It will be noted that the link 14 and the slot 16 are slightly longer than the link 13 and slot 15, due to its angular position between the lug 11 and arm 9 and the fact that during the swinging or pivotal movement of the headlight 4 there is greater movement on the part of the link 14 with respect to the headlight than with the link 13.

In Figure 3, it will be noted that the relative position illustrated discloses the position of the headlight when the vehicle is traveling down grade, the counter-balance weight being swung away from its vertical position causing the link 13 to exert a pull on the lug 11 and causing the headlight 4 to be moved to the proper position so that the light rays therefrom will be directed downwardly in the path in which the vehicle is traveling.

It will be noted that as the headlight 4 inclines downwardly at its forward end, the pin 12 will move toward the inner end of the slot 16 in the link 14, but when the headlight is in its normal horizontal position as shown in Figure 2, the pin 12 is in the outer ends of the slots 15 and 16. When the machine travels upwardly on an incline, the pin 12 will be maintained in the outer end of the slot 16 of the link 14 so as to cause the headlight to tilt downwardly from its horizontal position with respect to the vehicle, thus causing the rays from the light to be directed in the proper position upon the roadway in advance of the vehicle.

It will be noted that as the vehicle travels up an incline, the pin 12 while engaged in the outer end of the slot 16 will move toward the inner end of the slot 15 and the position of the pin relative the slots is reversed when the vehicle is traveling on a down grade as shown in Figure 3, thus maintaining the headlight on the same plane with the vehicle.

It will be apparent from the foregoing, that I have provided a simple and inexpensive device which can be attached to vehicle headlights that are pivotally mounted upon their supporting means.

Referring particularly to the headlight 4, attention is directed to the fact that it is in tubular or hood formation, which hood formation projects to a considerable length forward of the pivot point or trunnion upon which it is mounted, and the bottom edge, at its mouth, is cut away, as shown, whereby the rays of light will be deflected at a side angle, so as to insure the road being fully illuminated.

Furthermore, it will be noted that owing to the hood formation of the headlight 4, it will shield the rays from an oncoming vehicle driver, and owing to the fact that the links and deflector are closely associated along the line of the hinged back rear cover, the said rays will function in an efficient manner, irrespective of the angle of the hood, bearing in mind that the deflector and its associated parts oscillate close to the trunnion point.

In Figures 4, 5 and 6, I have illustrated a slightly modified form of the invention wherein I have provided means for substantially locking the headlight 4' in normal position, this locking feature while allowing for movement of the headlight when the vehicle inclines, will prevent the headlight from chattering while the vehicle is traveling on substantially level ground.

The modified form includes the standard 1' carrying the supporting arms for the headlight which include the parallel portions 2'. Pivotally mounted between the parallel portions is the balance-weight 10' attached to the arm 9' which in turn is pivoted upon the transverse pin 7'.

Extending downwardly from the headlight is a perforated lug 11' carrying a pin 12'. The lug 11' is movably connected with the arm 9' by means of the links 13' and 14'. The outer end of the links 13' and 14' are provided with longitudinal slots 15' and 16' which permit sliding movement of the links with regard to the pin 12' during the tilting movement of the headlight.

It will be noted that the lower end of the lug 11' extends forwardly at an angle below the pin 12' and pivotally mounted upon this forwardly extending portion is a cam 17. This cam is provided with an arcuate slot 18 in its upper portion and with a straight inclined slot 19 in its lower portion, these slots meeting at a substantially central point in the cam, thus providing a receiving pocket for the pin 12' so that when the headlight 4' is in its normal position as shown in Figure 4, the pin will be within this pocket and assist in retaining the headlight against chattering.

The cam 17 is actuated through the movement of the headlight by means of a link 20, one end of which is pivotally connected to the upper portion of the cam and the other end pivotally connected to the upper end of the arm 9' so that the link 20 moves simultaneously with the links 13' and 14'.

It will be apparent from the above that I have provided a simple and inexpensive modification of my improved headlight wherein the headlight will be securely locked against chattering during the traveling of the vehicle over comparatively level surface and wherein the headlight may be either adjusted through the action of the weight 10' or may be manually adjusted by grasping the finger piece 21 which is attached to the under surface of the headlight and in a convenient position to be grasped by the operator.

I claim:

1. In a vehicle headlight, means for pivotally supporting the headlight, a counter-balance weight pivotally mounted below the headlight and links forming a direct connection between the weight and the headlight for normally maintaining the headlight in the same general plane as the vehicle.

2. In a vehicle headlight, spaced supporting arms, means for pivotally mounting the headlight between said arms, a weight pivotally mounted beneath the headlight, and link members having one of their ends slidably and pivotally connected directly to the headlight, and the other ends having pivotal connection with the weight, with the ends of said links arranged upon opposite sides of the pivot point.

3. In a vehicle headlight, spaced supporting arms, means for pivotally mounting the headlight between said arms, a pivot pin connecting the arms below the headlight, a movable weight, an arm projecting from the weight and pivotally mounted upon the pin, a lug extending downwardly from the headlight, a pin carried by the lug, a link having pivotal connection with the arm above its pivot point and slidable and pivotal connections with the lug, and a second link having pivotal connections with the arm below its pivot point and slidable and pivotal connections with the pin carried by the lug.

4. In a headlight, the shell of which is in hood formation and of proportionate great length forward of the lamp deflector, trunnions extending from the hood, spaced supporting arms for the trunnions, a weight pivotally mounted beneath the headlight, and link members each having one of their ends slidably and pivotally connected direct to headlight and the other ends having pivotal connection with the weight, with the ends of said links arranged upon opposite sides of the pivot point.

In testimony that I claim the foregoing I have hereunto set my hand at Milwaukee, in the county of Milwaukee and State of Wisconsin.

GUSTAV A. THOM.